Nov. 8, 1966     W. FEINBLOOM     3,283,446
CORNEAL CONTACT LENS TOOL
Filed Oct. 5, 1965
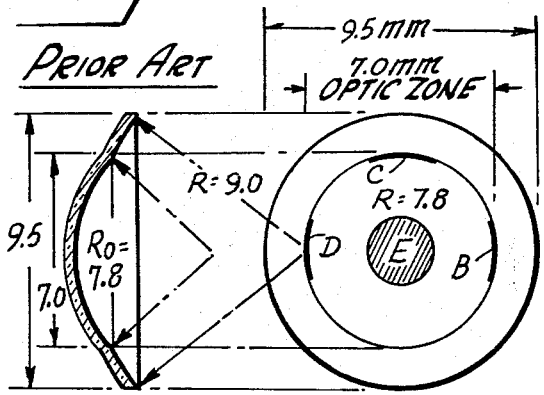
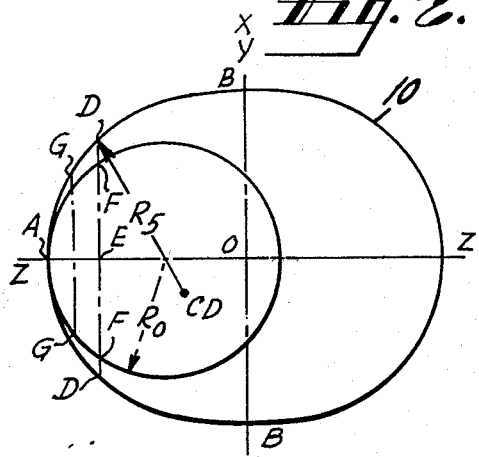
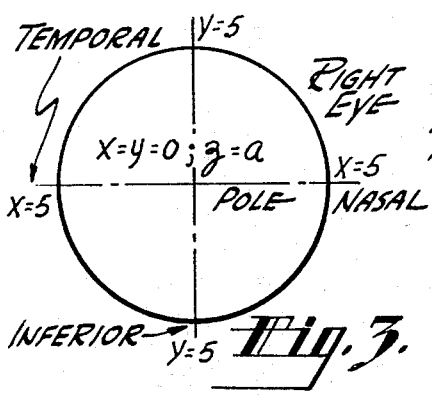
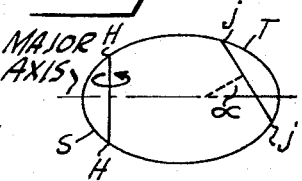
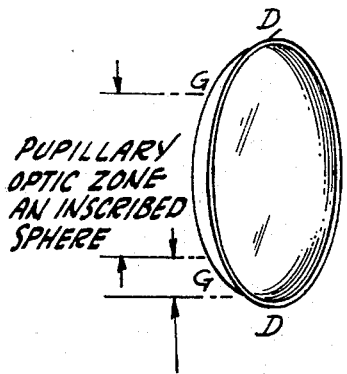
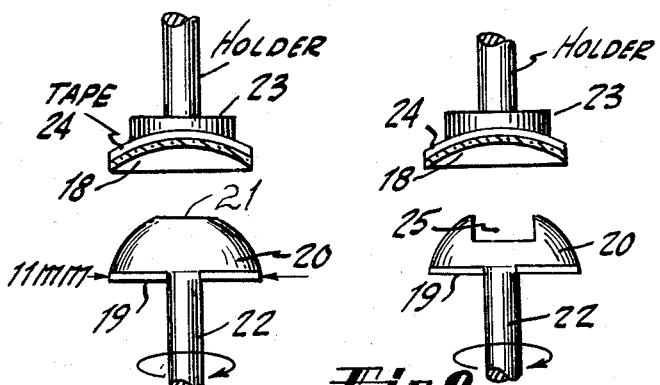
INVENTOR.
WILLIAM FEINBLOOM
BY
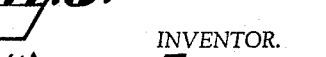
Attorney _United States Patent Office_

3,283,446
Patented Nov. 8, 1966

3,283,446
CORNEAL CONTACT LENS TOOL
William Feinbloom, 138 E. 36th St., New York, N.Y.
Filed Oct. 5, 1965, Ser. No. 493,133
7 Claims. (Cl. 51—98)

This application is a continuation-in-part of my application Serial No. 131,796, filed August 16, 1961, now United States Patent No. 3,227,507 granted January 4, 1966.

This invention concerns an improved concave-convex contact lens of the type which is designed to rest upon the cornea or over the colored portion of the eye and not extend into the scleral or white portion.

The present day art of fitting corneal contact lenses, generally stated, consists in selecting a lens made up of an inner spherical surface (or toric surface) to best fit the corneal curves of the eye at the apex of the cornea and then examing this fit with fluorescein solution between the lens and the eye. It is almost invariably found by this procedure that if the lens clears the apex of the cornea it impinges tightly on the peripheral areas. By a series of auxiliary bevels or secondary surfaces these areas are ground away in an attempt to obtain the best approximate fit of the cornea. Thus in an average corneal type contact lens of 10 mm. diameter the inner 6 to 7 mm. is usually left untouched, and is the radius closely approximating the Keratometer value of the corneal radius, and the remaining 1.5 to 2 mm. circular annulus is ground to one or more longer radii.

To be more specific, according to conventional practice, in order to make the inner surface of the lens compatible to the cornea, the lens is first reduced in diameter to as small a size as possible for the purpose of using the central "optic zone" of about 6 to 7 mm. in diameter as a bearing surface for the lens. However, a lens as small as 6 to 7 mm. in diameter does not work well in the eye because of two problems that arise. (1) Such a small lens nearly always causes lid irritation in blinking due to the fact that the margin of the lids contains the greatest concentration of nerve endings and, (2) such lenses slip readily due to lid action and will either be displaced off the cornea or fall out of the eye. Still further, such lenses are not satisfactory because of the tight fit at the peripheral areas.

The shape of the cornea of the eye is, in fact, that of an ellipsoid. It is for this reason that the central problem of fitting a corneal contact lens more accurately to the human eye has not been solved by the present day spherical, toric, or parabolic lenses. From my study of the measurements of hundreds of eyes and the making of contact lenses to fit these measurements and the testing of such lenses by actual wearers, I have found that, (a) an ellipsoid represents a better approximation of the form of the surface of the cornea of the human eye, and (b) contact lenses with inner ellipsoidal surfaces represent a marked improvement in the comfort and wearing time by the patient. These highly desirable results may be explained as follows: (1) The ellipsoidal form of surface of the corneal contact lens distributes the pressure of the lens on the cornea more evenly over the surface of the cornea. (2) Larger diameter lenses that avoid lid irritation may now be used than is at present possible because the ellipsoidal surface is a bearing surface and so reduces the total pressure per unit area. (3) The inner ellipsoidal bearing surface results in more accurate centering of the lens around the optic axis of the eye and so avoids astigmatism and provides better visual results. (4) The inner ellipsoidal surface results in less slipping of the lens with blinking or eye movements and so reduces friction due to lens movement, and (5) The inner ellipsoidal surface results in less lens rotation and so produces better stationary alignment for cases requiring bifocals and astigmatic correction for residual astigmatism.

In the drawings:
FIG. 1 illustrates the trouble experienced in the use of conventional lenses;
FIG. 2 shows the general form of an ellipse, the left portion of which conforms to the shape of the cornea, and is given to aid in the explanation of the invention;
FIG. 3 is helpful in an understanding of certain measurements related to the right eye and which are referred to hereinafter;
FIG. 4 illustrates how different ellipsoidal inner surfaces can be generated to form the innner surface of the contact lens of the invention;
FIGS. 5 and 6 show different embodiments of corneal contact lenses having ellipsoidal inner surfaces and;
FIGS. 7 and 8 show how the inner surface of a spherical lens can be ground according to the invention to form an ellipsoidal peripheral surface in accordance with another embodiment of the invention.

A better appreciation of the results achieved by the corneal contact lens having an ellipsoidal surface may be had by examining the radii that are usually employed in the present day art of fitting corneal contact lenses, with particular reference to FIG. 1 of the drawing.

The apex of the optic zone has its radius determined by the ophthalmometer. Let it be assumed, as frequently happens, that this reading is 7.80 mm. Then a lens is usually selected that has a 7.80 mm. inside spherical surface. The diameter chosen depends on the nature of the lid positions, lid tensions, etc. Let it be assumed that an average lens of 9.5 mm. diameter is chosen. Then the lens is fabricated as in FIG. 1, so as to have a central optic zone of 7.0 mm. diameter, and the remaining surface is made of 9.0 mm. radius. The edges are then rounded and smoothed as experience dictates, and the lens as thus finished is inserted into the eye; and fluorescein added to flow between lens and eye to observe the nature of the fit under ultra violet light. In many eyes a bright green ring will be observed around the periphery corresponding to the 9.0 mm. radius zone indicating the lens does not rest here but clears completely. In such eyes some blue patches or zones will appear at or near the junction line as at B, C, or D, or a blue area at E which is the central or apex region. These blue areas may remain in all positions that the eye assumes or may appear and disappear as the eye rotates. The bluish areas represent touching areas of pressure of varying degree of the lens on the eye depending on how dark and steadfast they remain over a period of a few minutes as the eye moves about.

If this lens proves uncomfortable for the patient, then the practitioner usually resorts to increasing the width of the 9.0 mm. radius zone and so decreasing the diameter of the optic or 7.0 mm. zone. There is a definite limit below which the optic zone cannot be reduced because when reduced below this limit (6.0 is probably the lowest limit) the patient complains of visual ghosts or flares. What happens is that the visual field is impinged upon by the secondary curve of 9.0 mm. radius and results in great annoyance to the patient. In fact, in nearsightedness where the pupils of the eye are generally larger than average, the optic zone must often be kept close to 7.5 mm. for safety. In such situation, the practitioner will frequently abandon the whole philosophy of avoiding tight areas, and simply reduce or increase the diameter (by making a new lens) and trust that the resulting fit will cause the lens to change its position often enough to allow the tight areas to move from one place to another and so allow the tissue of the cornea to recover.

It is to overcome this difficulty that the ellipsoidal surface is of great benefit—for by distributing the bearing surface over a greater area, the pressure per unit area is reduced, and tissue disturbances are minimized.

In the example given in FIG. 1, the practitioner may try, in view of the touch at E, to use a lens of 7.75 or 7.70 cental radius and so avoid the touch at E. Occasionally, this may be successful—usually however, the touches at B, C and D are increased either in extent of area or in degree of tightness. Should the practictioner try to overcome the tight spots at B, C and D, by increasing the radius to 7.85 or 7.9, then the touch at E will become more pronounced and the ultimate discomfort of the patient even greater.

Any attempt to reduce the width of the 9.0 radius zone, in order to get bearing surface here, will usually quickly end in disaster, because a spherical surface cannot match or correspond to the ellipsoidal surface of the eye and must dig into it at its edges, and the resulting tight areas soon asphyxiate the cornea, and the patient notices a blurring of vision after 4 to 8 hours wear, as the cornea swells. This swelling may last from 1 to 10 hours after removal of the contact lens from the eye.

Various attempts to improve circulation of air and tears under the lens, such as the introduction of apertures, grooves, beads and slits, as disclosed in my U.S. Patent 2,129,305, have provided only temporary and limited relief to the patient.

One aspect of the present invention is a corneal contact lens which has an inner ellipsoidal surface in whole or in part conforming to the ellipsoidal surface of the cornea of the eye on which it is designed to rest. Such a lens may be fitted to the patient either on a measurement basis or on a trial case basis. The trial case procedure is discussed hereinafter in connection with another aspect of the invention. Another aspect of the present invention involves the development of a series of ellipsoidal lenses and combinations and variations thereof to serve as trial sets for determining the best fitting lens. Still another aspect of the invention involves a method of fabricating corneal contact lenses having an inner ellipsoidal surface.

An appreciation of the invention may be better understood from an inspection of FIG. 2 which shows an ellipse 10, the left portion of which approximates the form of the cornea. FIG. 2 is not drawn to scale and the ellipse 10 is exaggerated and deviates somewhat from true form in order to more clearly show the positions of the different points and lines.

Since the cornea is a 3-dimensional ellipsoid, it is simpler to consider the horizontal meridian separately from the vertical meridian for these are frequently of different values and shapes. Therefore let us designate in the horizontal plane (nasal-temporal) the BB line as the X axis, and for convenience when discussing the vertical plane (superior-inferior) the same BB line in the diagram as the Y axis. The Z axis is always the anterior-posterior line from the apex of the cornea through the center of the pupillary area to the fovea of the retina.

The X, Y and Z axes are the coordinate axes of the ellipsoid and are perpendicular to each other.

The line AO is the optic axis of the cornea and is the major semi-axis of the ellipse and may be 13.0 mm. The line OB is the minor semi-axis and may be 9.8 mm. The ellipse is shown in the horizontal plane as having its major axis as Z and minor axis as X, respectively. The line $R_0$ equals $AC_0$ and is the radius of the inscribed circle at the apex of this ellipse and is 7.3 mm. A line DD is drawn at right angles to the major Z axis such that it intersects the major axis at E and the ellipse at the two points D, D, and intersects the inscribed circle at points F, F. The line ED is made to be equal to 5.0 mm. The point D then represents the point on the corneal surface that is 5 mm. away from the optic axis AO of the cornea, i.e. $x=5$ mm. It is a fact that the point D on the ellipse never coincides with a point F on the circle except at the apex A. Stated another way, the rate of change of the curvature of the point D increases as it moves away from the apex towards point B while the rate of curvature of every point on the circle remains constant. This difference is the main problem in the more perfect fitting of contact lenses to the human eye which is solved by the present invention. The ellipsoidal inner surface of the contact lens of the invention is represented in the horizontal meridian by the elliptical portion DD, as is the cornea itself. A similar discussion applies to the vertical meridian where line BB is the Y axis.

*Method of determining the form of the ellipse of the corneal surface in any meridian*

Although there are several methods that may clinically furnish the value of the ellipse in any meridian, the preferred method is one in which radii measurements are taken at the pole of the cornea (really the ophthalmometer pole) and at any other known point. This method is done with a standard modern ophthalmometer or Keratometer, and is subject to minimum error and is quickest and simplest to use. What is required is to find the general equation for the curvature at any point on an ellipse in a plane. This curvature can be expressed in terms of $R_0$, the radius of curvature at the pole of the cornea, and in terms of $R_5 = DC_d$, the radius of the curvature at the point where $X=5$ mm. for the horizontal plane or for that matter in terms of $R_x$ for any value of $x$. Note FIG. 2. The equation is in terms of "$x$" because in the living eye the value of $R_x$ for any "X" coordinate is more easily measured than a linear measurement of any Z coordinate.

The derivation of the equation of curvature for any point on an ellipse in terms of "$x$" will now be given.

(1) The general equation of the ellipse in the horizontal meridian is $$\frac{z^2}{a^2} + \frac{x^2}{b^2} = 1$$

where $a$ = semi-major axis
where $b$ = semi-minor axis (2)
$$b^2 z^2 + a^2 x^2 = a^2 b^2$$

or (3) by taking the first derivative, we now obtain $$x' = \frac{dx}{dz} = 2b^2 z + 2a^2 x \frac{dx}{dz} = 0$$

(4)
$$a^2 x \frac{dx}{dz} = -b^2 z$$

or (5)
$$X' = \frac{dx}{dz} = \frac{-b^2 z}{a^2 x}; \text{ and } (x')^2 = \frac{b^4 z^2}{a^4 x^2}$$

or (6) now the derivative of $$d\left(\frac{u}{v}\right) = \frac{V du - u dv}{V^2}$$

(7) therefore, the second derivative is $$x'' = \frac{d^2 x}{dz^2} = \frac{-a^2 x b^2 - b^2 z a^2 \frac{dx}{dz}}{a^4 x^2}$$

(8)
$$x'' = \frac{-a^2 b^2 x + a^2 b^2 x \left(\frac{b^2 z}{a^2 x}\right)}{a^4 x^2}$$

or (9) $$x'' = \frac{-a^2b^2x + \frac{b^4z^2}{x}}{a^4x^2}$$

(10) $$x'' = \frac{-a^2b^2x^2 + b^4z^2}{a^4x^3}$$

(11) $$x'' = \frac{-b^2(a^2x^2 + b^2z^2)}{a^4x^3} = \frac{-b^2(a^2b^2)}{a^4x^3}$$

(12) $$x'' = \frac{-a^2b^4}{a^4x^3} = \frac{b^4}{a^2y^3}$$

(13) now the general equation for curvature K at any point on a curve is

(13) $$K = \frac{1}{r} = \frac{x''}{[1+(x')^2]^{3/2}}$$

(14) $$\therefore \frac{1}{r} = -\frac{b^4}{a^2x^3} \times \frac{1}{\left[1 + \frac{b^4z^2}{a^4x^2}\right]^{3/2}}$$

(15) $$\frac{1}{r} = -\frac{b^4}{a^2x^3} \times \frac{1}{\left[\frac{a^4x^2 + b^4z^2}{a^4x^2}\right]^{3/2}} = \frac{-b^4}{a^2x^3} \times \frac{a^6x^3}{(a^4x^2 + b^4z^2)^{3/2}}$$

or

(16) $$= \frac{-a^4b^4}{(a^4x^2 + b^4z^2)^{3/2}}$$

(17) for the polar point of the ellipse, $x=0$, $z=-a$ then $$K_0 = \frac{1}{r_0} = \frac{-a^4b^4}{[(a^4 0) + b^4 a^2]^{3/2}} = \frac{-a^4b^4}{a^3b^6} = -\frac{a}{b^2}$$

(18) $$r_0 = -\frac{b^2}{a}$$

or

(19) from (16)

$$r = -\frac{[a^4x^2 + b^4z^2]^{3/2}}{a^4b^4}$$

(20) from (2)

$$b^2z^2 = a^2b^2 - a^2x^2(b^2 - x^2)$$

(21) $$\therefore r = -\frac{[a^4x^2 + b^2a^2(b^2 - x^2)]^{3/2}}{a^4b^4}$$

(22) $$= \frac{(a^4x^2 + a^2b^4 - a^2b^2x^2)^{3/2}}{a^4b^4}$$

(23) $$r = \frac{a^3(a^2x^2 + b^4 - b^2x^2)^{3/2}}{a^4b^4}$$

(24) $$r_x = \frac{(a^2x^2 + b^4 - b^2x^2)^{3/2}}{ab^4}$$

We now have a set of useful equations for determining the ellipse of any cornea in any meridian. We use equations

(18) $$r_0 = -\frac{b^2}{a}$$

and

(24) $$r_x = \frac{(a^2x^2 + b^4 - b^2x^2)^{3/2}}{ab^4}$$

(25) for the vertical meridian $$r_y = \frac{(a^2y^2 + b^4 - b^2y^2)^{3/2}}{ab^4}$$

In Equation 18, for $r_0$ there is substituted the measured value of the ophthalmometer reading at the pole or as the patient looks directly into the center of the instrument. Here then, is one equation with $a$ and $b$, the semi-major and semi-minor axes. In Equation 24 there is substituted for $r_x$ the value obtained with the ophthalmometer while the eye is fixating that point to one side of the instrument axes such that the image to be measured falls precisely the distance "$x$" from the pole of the patient's eye. The value of "$x$" chosen should be as large as possible. Existing ophthalmometers will only measure up to $x=5$ mm. and sometimes to only $x=4.5$ mm. In any case, both the value of $x$ and $r_x$ are substituted in Equation 24 as a result of which there is obtained another equation with $a$ and $b$. Because there are now two simultaneous equations involving $a$ and $b$, it is a simple matter to solve for these values. Knowing the numerical values of $a$ and $b$ it is then possible to graph the ellipse that fits $R_0$ and $R_x$.

I have measured several hundred eyes and determined the values of $R_0$ and $R_5$ in each case. I have measured the two primary meridians, usually the horizontal and the vertical. I have also measured the $R_5$ both temporally and nasally and superior and inferior, where $R_5$ is the radius of curvature at the point where $x=5$ mm. FIG. 3 is helpful in an understanding of these measurements as related to the right eye. I have also measured many intermediate and secondary meridians between the two primary meridians. The data of interest will now be summed up. In this summation, the coordinates or axes of the cornea of the eye are designated as follows: The optic or visual axis (anterior-posterior) is the Z axis; the superior-inferior axis (vertical) is the Y axis, and the nasal-temporal axis (horizontal) is the X axis.

(1) In almost all cases investigated, the nasal and temporal radii of curvature $R_5$ are both greater than the radius of curvature $R_0$ at the pole. This data fits the form of an ellipse. Where the nasal $R_5$ is equal to the temporal $R_5$ the ellipse is symmetrical around the optic or visual axis, whereas when the nasal $R_5$ differs from the temporal $R_5$ the ellipse is unsymmetrical around the optic or visual axis. (FIG. 4.) The vast majority of human eyes are unsymmetrical.

(2) The nasal radius of curvature $R_5$ is greater than the radius of curvature $R_0$ at the pole by amounts varying from 5% to 50% of $R_0$. The nasal radius of curvature $R_5$ is almost always greater than the temporal radius of curvature. The superior radius of curvature $R_5$ is closer to the inferior radius of curvature. Hence, ellipses of the cornea are generally unsymmetrical.

(3) In about 75% of the cases investigated, the superior-inferior ellipse of the Y axis is significantly smaller than the temporal-nasal ellipse of the axis.

The contact lens made by the tool of the present invention to be described later is made to conform as precisely as possible to the measurements taken of the cornea in accordance with the foregoing findings. Accordingly, the lenses have interior ellipsoidal surfaces, some lenses having unsymmetrical ellipsoidal surfaces and others symmetrical ellipsoidal surfaces depending upon the configuration of the particular eye to be fitted. Where the vertical and horizontal measurements of the ellipses are different, the corneal contact lenses of the invention take care of two other types of elliptical surfaces. One such surface I call a "toric ellipsoid," the other I call an "elliptical torus."

FIG. 4 is given as an aid to the following definitions to illustrate how various ellipsoidal surfaces can be generated. FIG. 5 illustrates a corneal contact lens made in accordance with the invention having an ellipsoidal inner surface generated in the manner described herein.

By definition, a symmetrical "toric ellipsoid" is generated by rotating a symmetrical segment of an ellipse about one of its minor chords HH which is transverse of or perpendicular to the major axis. This will produce an ellipse in one meridian (usually horizontal for the eye) and a circle as cross-section in the other meridian. By definition, an unsymmetrical "toric ellipsoid" is generated by rotating a segment T of an ellipse and which is unsymmetrical with respect to the major axis about the cord JJ the perpendicular of which intersects the major axis at an angle α. Also by definition, an "elliptical torus" is generated by rotating a segment of one size ellipse M around the contour of another size ellipse N. The resulting figure is similar to a squashed doughnut. The surface of such a torus will have a curvature in one meridian the ellipse M and at right angles the form of ellipse N.

I have found that corneal contact lenses made with the inside surfaces as toric ellipsoids conform most satisfactorily to eyes which have different vertical and horizontal ellipses. They are especially important in cases of high astigmatism and also where it is desired that there be a minimum or no rotation of the lens about the optic or Z axis (the anterior-posterior axis).

For convenience, I have adopted forms of notation as follows with respect to the lens of the invention:

$R_0$ = radius of curvature of either the cornea or the inner surface of the corneal contact lens at the apex or pole, where $Z=\alpha$ and $Y=0$ and $X=0$.

$R_x$ or $R_y$ = radius of curvature of either the cornea or inner surface of the corneal contact lens at point where $x$ or $y$ = some definite value. Usually, $R_5$ is used which represents the value of the radius of curvature in the horizontal meridian where $x=5$ mm. and in vertical meridian where $y=5$ mm.

To conveniently designate or identify the form of the elipse for a given cornea or for a given corneal contact lens of the invention, I employ the expression $R_0$-$R_y$ in the vertical meridian, and in the horizontal meridian $R_0$-$R_x$. For example in the horizontal meridian (H) the ellipse may be written as $R_0=7.3$-$R_5=9.5$. These figures are sufficient to designate the precise form or equation of the ellipse concerned using these values of $x=5$ mm., $R_0=7.3$ mm. and $R_5=9.5$ mm. It is a simple matter with this information to make the proper substitutions in Equations 18 and 24 and solve for $a$ and $b$ and thus actually plot the curve of the ellipse.

A toric ellipsoid may be indicated as $$\begin{array}{c|c} V & R_0=7.1 \\ \hline H & R_0=7.3-R_5=9.5 \end{array}$$

which means that the vertical meridian V has a circular radius of 7.1 mm. and that the horizontal meridian H is an ellipse of the form $R_0=7.3$ mm.-$R_5=9.5$ mm.

An elliptical torus is indicated as $$\begin{array}{c|c} V & R_0=7.1-R_5=9.4 \\ \hline H & R_0=7.3-R_5=9.5 \end{array}$$

which means that the vertical merdian V is an ellipse of characteristics $R_0=7.1$ mm. and $R_5=9.4$ mm. and the horizontal meridian H is an ellipse of characteristics $R_0=7.3$ mm. and $R_5=9.5$ mm.

The variation of the ellipsoidal surface to accomodate the optic zone

When the radii of the cornea are successively measured at $X=Y=0, 1, 2, 3, 4$ and $5$ mm., it becomes apparent that the enclosed pupillary area bounded by $x=y=3$ mm., (GG in FIG. 2), is very close to the inscribed circle of radius $R_0$. In other words, the pupillary optical zone coincides substantially for practical purposes with the inscribed sphere of radius $R_0$. In order to obtain the best possible visual results on patients fitted with corneal contact lenses of the present invention having inner ellipsoidal surfaces, I have found it desirable to make the optic zone area (GG in FIG. 2) an inscribed sphere of radius $R_0$. This spherical or optic zone usually varies from 6 to 7.5 mm. area in diameter. The result is that the lens in cross-section (FIG. 2) is of spherical surface up to GG on the inner surface thereof and then continues on as elliptical to points DD or beyond if a larger diameter lens is required. FIG. 6 is a perspective view of a corneal contact lens having an ellipsoidal inner surface.

The method of making elliptical surfaced contact lenses

A preferred method of making contact lenses with inner elliptical surfaces, involves the following steps:

(1) The data for the ellipse in any meridian is obtained from the two ophthalmometer readings on the eye in that meridian, namely, $R_0$ and $R_x$ or $R_y$.

(2) These radius readings are substituted in the simultaneous Equations 18 and 24 above.

$$R_0 = -\frac{b^2}{a}$$

$$R_y = \frac{(a^2y^2+b^4-b^2y^2)^{3/2}}{ab^4} \text{ or } R_x = \frac{(a^2x^2+b^4-b^2x^2)^{3/2}}{ab^4}$$

and the equations solved for "$a$" and "$b$."

(3) These values of $a$ and $b$ are used as constants in Equation 1, and the equation of this ellipse is plotted in the usual way.

A method of making a composite spherical optic zone and an ellipsoidal inside surface I have evolved a method of taking a finished spherical contact lens, that is, one which has the required $R_0$ in the spherical optic zone on the interior surface, and a proper curve on the exterior surface (to give the proper prescription) and then grinding onto the inner surface outside of the optical zone of the lens an ellipsoidal peripheral surface (or toric ellipsoid or elliptical torus surface) of selected desired dimensions to fit the patient's eye. The method involves the following steps and utilizes the equipment shown in FIGURES 7 and 8.

(1) A positive grinding tool 19 of the desired ellipsoidal surface 20 is formed, preferably of cast iron or meanite metal or abrasive stone or brass covered with 600–800 mesh diamonds, and of an outer diameter of approximately 11.0 mm. The grinding tool has a flat surface at apex 21 or a recess 25 extending over an area of 6.5 mm. diameter. The major or long axis of the ellipse lies along the long axis of the shaft 22. The purpose of the recess 25 is to prevent any grinding or scarring of the central spherical surface of the lens if some of the abrasive material collects on the flat surface.

(2) The grinding tool 19 is mounted in a chuck and linked by means of a shaft 22 to a motor lathe turning at a speed of about 150 r.p.m. or higher. A spherical contact lens 18 is then mounted on a suitable stationary holder 23 with either blocking wax or double adhesive tape (adhesive on both sides of the tape) 24.

(3) While the ellipsoidal tool 19 is rotating in the chuck of the motor, fine emery is added when cast iron is used, or water added when an abrasive stone or a diamond tool is used, and the lens brought in contact with the ellipsoidal tool. If the proper tool has been selected, the grinding of the lens will always start at the outer periphery and continue inwards, thereby grinding a fairly true elliptical surface. The lens holder is held in the hand and pressed against the grinding tool with intermittent wetting of the grinding tool by taking the lens away from the tool. This is continued until the desired optic zone area is left. This is usually 7 mm. to 7.5 mm. Where necessary, this can be reduced to 6.5 mm. and even less.

(4) The lens is polished on an elliptical polisher having the same elliptical dimensions as the grinding tool, which dimensions include the thickness of the polishing cloth. This, together with any standard plastic polishing liquid, will polish out any grinding marks left in the lens and give a high gloss and smooth finish.

(5) Thus, by having a set of grinding tools made up with varying ellipsoidal surfaces through a range as found in the human eye it is possible to create such surfaces on all spherically formed contact lenses. In the human eye, $R_0$ usually varies from 7.0 to 8.7 mm., generally in steps of .05 mm. and $R_5$ varies from 7.5 to 11.5 mm. in steps of .5 mm.; hence there may be required approximately 200 tools for grinding the elliptical surfaces on all sizes of the finished spherical lenses unless a greater tolerance can be permitted in the fitting of the lenses to the eye, in which case only half the number of tools will be required. This method permits the practitioner to make modifications while the patient is still before him in the office.

(6) A toric ellipsoid or an ellipsoidal torus surface can be ground on a spherical contact lens by starting with a toric ellipsoid or ellipsoidal torus grinding tool and mounting the lens holder in a jig similar to that used in grinding toric surfaces on spectacle lenses. Essentially, this simply consists in insuring that while the lens oscillates from side to side and rotates, that the grinding tool similarly oscillates in synchronism therewith and that the coordinate $x$ and $y$ axes of the lens and grinding tool remain fixed relative to one another.

What is claimed is:

1. A tool for grinding away a peripheral portion of the inner surface of an already formed plastic corneal contact lens of the type which is designed to rest upon the cornea, comprising an ellipsoidal grinding surface with the apex recessed and mounted on a shaft to permit rotation, the long axis of the ellipsoid being coincident with the axis of said shaft.

2. A tool for grinding away a peripheral portion of the inner surface of an already formed plastic corneal contact lens of the type which is designed to rest upon the cornea, comprising an ellipsoidal grinding surface with the apex flattened and mounted on a shaft to permit rotation, the long axis of the ellipsoid being coincident with the axis of said shaft.

3. A tool for grinding away a peripheral portion of the inner surface of an already formed corneal contact lens, comprising an end portion having an ellipsoidal peripheral grinding surface, said ellipsoidal peripheral surface having its vertex on the major axis of the ellipsoid wherein in at least a first meridian the ellipse conforms substantially to the equations (1) $$r_0 = \frac{b^2}{a}$$

(a) $$r_x = \frac{(a^2 x^2 + b^4 - b^2 x^2)^{3/2}}{ab^4}$$

where
$r_0$ = the radius of curvature at the apex of the cornea;
$r_x$ = the radius of curvature of the cornea at that point which is a distance $x$ approximately 4.5 mm. from the major axis of the ellipse contained in said meridian;
$a$ = the semi-major axis of the ellipse in said meridian; and
$b$ = the semi-minor axis of said ellipse.

4. A tool according to claim 3, wherein said ellipsoidal surface is a toric ellipsoidal surface.

5. A tool according to claim 3, wherein said ellipsoidal surface is an elliptical torus.

6. A tool for grinding away a peripheral portion of the inner surface of an already formed plastic corneal contact lens, comprising an ellipsoidal grinding surface having such major and minor axes as to impart an inner surface to the lens closely approximating the human cornea.

7. In combination, a holder for a contact lens, and a grinding tool comprising an ellipsoidal grinding surface having such major and minor axes as to impart an inner surface to the lens closely approximating the human cornea and means for mounting said holder and tool for relative coaxial rotation.

References Cited by the Examiner
UNITED STATES PATENTS

| | | | |
|---|---|---|---|
| 152,442 | 6/1874 | Walters et al. | 51—206 |
| 1,303,541 | 5/1919 | Curtis | 51—206 |
| 2,237,744 | 4/1941 | Mullen. | |
| 3,032,936 | 5/1962 | Voice | 51—124 |
| 3,087,284 | 4/1963 | Kratt | 51—284 X |
| 3,117,396 | 1/1964 | Dalton | 51—284 X |

LESTER M. SWINGLE, *Primary Examiner.*